United States Patent [19]

Rudi et al.

[11] Patent Number: 5,475,548
[45] Date of Patent: Dec. 12, 1995

[54] ELECTROSTATIC DISCHARGE PROTECTION FOR A MAGNETIC TAPE CARTRIDGE

[75] Inventors: Guttorm Rudi, Fjellhamar; Per O. Pahr, Lier; Bjorn Engan, Oslo, all of Norway

[73] Assignee: Tandberg Data Storage AS, Oslo, Norway

[21] Appl. No.: 238,893

[22] Filed: May 6, 1994

[51] Int. Cl.$^6$ .................. G11B 15/675; G11B 23/50; G11B 33/14
[52] U.S. Cl. .................. 360/96.5; 360/137; 361/220
[58] Field of Search .................. 360/96.5, 93, 137, 360/92, 99.02, 99.06; 369/72, 73, 77.1, 77.2; 361/212, 220; 242/338, 338.4, 906

[56] References Cited

U.S. PATENT DOCUMENTS

| | | | |
|---|---|---|---|
| Re. 33,224 | 5/1990 | Spiegelstein | 360/93 |
| 3,071,791 | 1/1963 | Cunningham et al. | 15/1.51 |
| 3,601,654 | 8/1971 | Long et al. | 360/132 |
| 3,692,255 | 9/1972 | Von Behren | 242/192 |
| 3,964,098 | 6/1976 | Kramer et al. | 360/93 |
| 4,156,260 | 5/1979 | Joshi | 360/96.1 |
| 4,337,908 | 7/1982 | Sims, Jr. | 242/198 |
| 4,363,070 | 12/1982 | Kisler | 361/212 |
| 4,392,177 | 7/1983 | Geyken | 361/221 |
| 4,498,112 | 2/1985 | Georgens et al. | 360/96.5 |
| 4,514,775 | 4/1985 | Manning et al. | 360/96.6 |
| 4,556,923 | 12/1985 | Olmstead | 360/93 |
| 4,573,091 | 2/1986 | Barton, Jr. et al. | 360/93 |
| 4,586,106 | 4/1986 | Frazier | 361/220 |
| 4,620,255 | 10/1986 | Cook et al. | 360/130.33 |
| 4,636,890 | 1/1987 | Rudi et al. | 360/96.5 |
| 4,654,746 | 3/1987 | Lewis, Jr. et al. | 361/220 |
| 4,656,541 | 4/1987 | Rhyner et al. | 360/96.5 |
| 4,673,995 | 6/1987 | Spiegelstein | 360/93 |
| 4,743,937 | 5/1988 | Martin | 355/3 DD |
| 4,785,363 | 11/1988 | Jacobs et al. | 360/93 |
| 4,807,067 | 2/1989 | Spiegelstein | 360/93 |
| 4,834,315 | 5/1989 | Watanabe et al. | 242/906 |
| 4,847,711 | 7/1989 | Inoue | 360/96.5 |
| 4,852,374 | 8/1989 | Gotanda | 361/212 |
| 4,864,458 | 9/1989 | Demorat, Jr. et al. | 361/212 |
| 4,928,194 | 5/1990 | Elly et al. | 360/99.02 |
| 4,964,015 | 10/1990 | Crooker et al. | 361/212 |
| 5,025,334 | 6/1991 | Perona et al. | 360/96.5 |
| 5,229,897 | 7/1993 | Kimula et al. | 360/96.5 |
| 5,233,393 | 8/1993 | Yoshida et al. | 355/271 |
| 5,239,427 | 8/1993 | Ooka et al. | 360/96.5 |
| 5,372,264 | 12/1994 | Rudi et al. | 211/41 |

FOREIGN PATENT DOCUMENTS

| | | | |
|---|---|---|---|
| 0552600 | 7/1993 | European Pat. Off. . | |
| 60-214467 | 10/1985 | Japan . | |
| 1227283 | 9/1989 | Japan . | |
| 224889 | 1/1990 | Japan | 369/73 |
| 2227868 | 9/1990 | Japan . | |
| 2236888 | 9/1990 | Japan . | |
| 3116577 | 5/1991 | Japan . | |
| 3185675 | 8/1991 | Japan . | |
| 4-090186 | 3/1992 | Japan . | |

Primary Examiner—Robert S. Tupper
Assistant Examiner—Craig A. Renner
Attorney, Agent, or Firm—Hill, Steadman & Simpson

[57] ABSTRACT

A magnetic tape drive for magnetic tape housed within a cartridge is provided which includes a rectangular access through which the cartridge is inserted into the drive and a wiping member operatively positioned at an edge of the access such that the cartridge is contacted during insertion into the drive. The wiping member is so constructed and coupled to electrical ground that electrostatic charge on the cartridge is bled to electrical ground, the wiping member being made of a conductive polymer or plastic material.

21 Claims, 4 Drawing Sheets

ELECTROSTATIC DISCHARGE PROTECTION FOR A MAGNETIC TAPE CARTRIDGE

BACKGROUND OF THE INVENTION

The present invention generally relates to magnetic tape drives. More specifically, the invention relates to magnetic tape drives for tape cartridges housing quarter-inch (¼ inch) width magnetic tape, e.g., streaming tapes for microcomputers.

Streaming magnetic tape drives generally are known wherein data are recorded on/played back (or read) from a length of magnetic tape contained in a streaming tape cartridge or cassette. Such cartridges essentially are rectangular and generally have a length greater than a width. Further, the cartridge includes not only the magnetic tape, but a capstan idler, a hinged dust cover, as well as a metal base plate.

An operator generally pushes the cartridge or cassette into an insertion channel toward a magnetic read head. Depending on the drive, the cartridge is inserted either width wise, i.e., front loaded, or length wise, i.e., end loaded.

Streaming tape cartridges including quarter inch (¼ inch) width magnetic tape usually come in two formats. One format generally is referred to as the 3-½ inch form factor. The other format generally is referred to as the 5-¼ inch form factor.

For example, for many years tape drives have been available for providing back-up storage for personal computers having Winchester disk drives. They permit the entire contents of the hard disk to be stored on a single tape cartridge of, for example, the type defined by ANSI X3.55-1977. See also U.S. Pat. No. 3,692,255, incorporated herein by reference. This type of cartridge has been sold in large numbers under the designations DC300 and DC600 by Minnesota Mining and Manufacturing Company.

Both the DC300 and the DC600 are identical mechanically except for the length of tape. This type of tape cartridge is hereafter referred to as the "DC600-type" cartridge, which is presently the most widely used configuration. That cartridge measures six inches in length by four inches in width. It has a belt capstan roller which may be engaged by a capstan drive roller to propel a length of magnetic tape, either 300 feet or 600 feet, between a pair of reels inside a plastic housing. The cartridge further has a hinged tape access door which may be opened to expose the tape. The opening of this tape access door increases the width of the tape cartridge from four inches to five and three-quarter inches when the door is fully opened. Both the DC300 and the DC600 are identical mechanically except for the length of tape.

For many years both floppy disk drives and Winchester disk drives have been manufactured according to a de facto size standard which requires that they fit within a physical envelope (rectangular box) measuring three and one-quarter inches in height by give and three-quarter inches in width by eight inches in length. The aforementioned dimensions are known throughout the computer peripherals industry as the five and one-quarter inch form factor. This is a name derived from the diameter of the disk.

Originally the DC600 type cartridge was designed to be loaded sideways into a tape transport sized to fit an earlier, larger form factor measuring eight inches in width. When the five and one-quarter inch Winchester disks first became popular it was believed that a tape drive could not be provided that would permit endwise loading of the DC600-type tape cartridge into the same form factor. The term "endwise" refers to loading the cartridge so that the side edge with the tape access door and belt capstan roller is generally parallel to a longitudinal axis of the frame (eight inch dimension of the form factor).

A variety of tape drives and tape cartridges are disclosed in the following U.S. patents:

| U.S. Pat. No. | Title |
|---|---|
| 5,025,334 | Auto-Loading Transport For Tape Cartridge With Tape Access Door And Belt Capstan Roller |
| 4,807,067 | Cartridge Tape Drive |
| Re. 33,224 | Drive For End Loading And Transversely Shifting Tape Cartridge |
| 4,673,995 | Cartridge Tape Drive With Friction Roller To Open Cartridge Door |
| 4,337,908 | Cartridge-Loading Apparatus For Tape Recorder Drives |
| 4,785,363 | Cartridge Alignment Mechanism For Tape Drive |
| 4,636,890 | Magnetic Tape Recorder |
| 4,514,775 | Streaming Cassette Tape Transport |
| 4,656,541 | Front Loading Cartridge Activated Clamp And Eject Mechanism |
| 4,156,260 | Cartridge-Loading Tape Recorder |
| 3,964,098 | Tape Deck With Drive Motor Remote From Driver Roller |
| 4,573,091 | Cartridge Tape Drive |
| 4,556,923 | Tape Cartridge Drive With Cartridge Door Opening Mechanism |
| 4,498,112 | Tape Cartridge Receptacle |

The disclosures of these patents are fully incorporated herein by reference.

The 3-½ and 5-¼ inch form factor magnetic tape cartridges generally are rugged and enjoy a relatively high reliability in use. However, due to the presence of the metal base plate, an electrostatic discharge can occur between the cartridge and the drive chassis when the cartridge is inserted into the drive. The discharge can occur because the metal base plate provides a low impedance source of charge.

Transient currents that result from these discharges can occur rapidly and have rise times in the nanosecond range, as well as magnitudes in the ampere range, if the discharge occurs between the base plate and drive chassis ground.

Streaming tape drives generally include a data bus by means of which data is communicated to and from electronics associated with the tape drive and, for example, a computer system. Due to the very low impedance of the data bus ground connected to the tape drives, and the unpredictable and sometimes high impedance between the tape drive casting and the computer chassis, transient waveforms arising from the transient-currents will partly couple into the data bus ground path and signal wires and disrupt data signalling. When this happens, errors fatal to operation of the computer system may occur.

In U.S. Pat. No. 4,847,711 there is described an electrostatic charge grounding system for an audio tape cassette drive. In this system, electrostatic charge on a cassette or disk is grounded, when the latter is inserted into a drive therefor through an opening formed in a front panel of the drive, through a grounding path connecting a hinge pin of a flap covering the opening normally by a biasing spring associated therewith to a chassis of the drive. There is, however, no provision for grounding the base plate of a streaming tape cartridge or for preventing data bus signaling disruptions.

SUMMARY OF THE INVENTION

The present invention provides an improved tape drive. More specifically, the invention provides an arrangement for controlling rapid electrostatic discharges between a magnetic tape cassette or cartridge and a magnetic tape drive chassis as the cassette is inserted into the drive.

To these ends, the invention provides for relatively slow controlled discharge to ground of charge from the cassette and isolation of the metal base plate of the cassette to all metal surroundings during the insertion process until the cassette is close to or reaches its final position.

In an embodiment, the invention provides a magnetic tape drive including an electronically conductive member comprising a conductive polymer and operatively positioned to engage and wipe the metal base plate of a tape cartridge as it is inserted into the tape drive. The electrically conductive member is isolated from the remainder of the drive but is coupled to ground such that charge is bled relatively slowly from the cartridge to ground as the cartridge is inserted into the drive.

In a preferred embodiment, the conductive member comprises a compressible strip.

In an embodiment, the invention provides that the compressible strip is bent in the form of an arch.

In an embodiment, the invention provides that the compressible strip is a series of accurate fingers.

In an embodiment, the invention provides that opposite corners formed between the fingers and a base are filled with electrical arc-preventing matter.

These and other features of the invention will become clearer with reference to the following detailed description of the presently preferred embodiments with reference to the accompanying drawings.

DETAILED DESCRIPTION OF THE PRESENTLY PREFERRED EMBODIMENTS

As discussed above, in accordance with the invention, a magnetic tape drive can be provided with means for coupling the metal base plate of a magnetic tape cassette to ground in such a manner that electrostatic charge is relatively slowly discharged to ground thereby preventing the introduction of electrostatic charge caused errors in data on the tape or transmitted by the data bus of the tape drive. Moreover, the metal base plate is isolated from all metallic parts of the drive during the insertion process until the tape cartridge is close to or reaches its final position. Arrangements for accomplishing the foregoing are illustrated in the figures.

Figure 1:
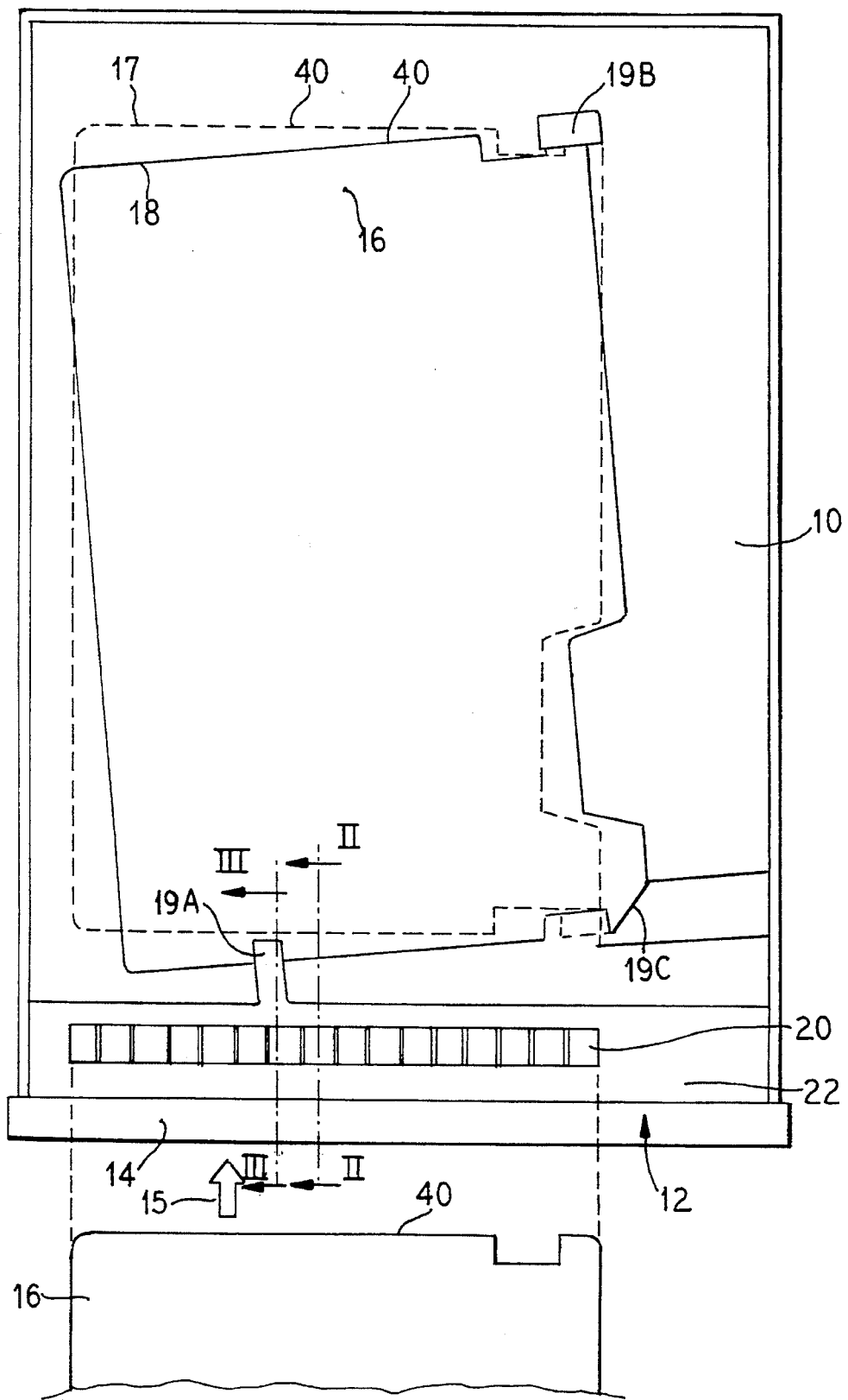
FIG. 1 illustrates in plan view the interior of a magnetic tape drive including a metallic grounding strip.

In FIG. 1 there is illustrated in top view the interior of a 5-¼ inch form factor magnetic streaming tape drive 10 whose top cover or lid is removed. The drive 10 is constructed for end loading of magnetic tape cartridges. In this regard, reference can be made to previously identified U.S. Pat. Nos. 4,807,067 and Re. 33,224.

While the invention can be employed in a variety of tape drives, the tape drive 10, developed by the assignee of the present application, is preferred. This drive is the subject matter of another application. Thus, certain features described herein may not be necessary if the invention is employed in other tape drives.

As illustrated, the tape drive 10 includes a front access 12 with a door 14 through which a magnetic tape cartridge or cassette 16 is inserted into the tape drive 10 in the direction of an arrow 15. The cassette 16 is introduced into the tape drive 10 through the access 14 until it reaches a position outlined by the broken line 17. The cassette 16 is then canted to the right to the final position outlined by the solid outline 18. In this final position, the cassette 16 is ready for use and is engaged by a read/write head, as is known.

It can be appreciated that the broken line 17 and solid outline 18 also indicate or outline an aluminum base plate associated with the tape cartridge 16. This base plate is positioned on the bottom side of the cartridge 16 relative to the view illustrated in FIG. 1, and as described, for example, in U.S. Pat. No. 5,025,334.

As also illustrated in FIG. 1, the drive 10 includes three blocks or lugs 19A, 19B, and 19C within which the cartridge 16 is captured or engaged when the cartridge 16 is in its final canted position. As will become clear, although these blocks are exposed in FIG. 1, they normally are covered by an insulating cover (see FIG. 3). The blocks 19A, 19B, and 19C are exposed in FIG. 1 merely for clarity in explanation.

The blocks 19A, 19B, and 19C serve to provide a three-point reference plane to secure the cartridge 16 in a known position relative to the read/write head of the drive 10.

As also illustrated, the tape drive 10 is provided with an electrically conductive member, preferably a metallic strip 20, along a bottom edge 22 of the front access 12. The strip 20 is received with a suitably shaped channel 25 in a top surface of the edge. This arrangement is the subject of U.S. application Ser. No. 07/824,525 filed Jan. 23, 1992, now abandoned.

As explained therein, this strip 20 is used to contact the metal base plate of the cartridge 16 with a wiping action as the cartridge 16 is inserted into the tape drive 10 thereby to bleed off electrostatic charge from the base plate during the insertion process. This metallic strip 20 preferably comprises a compressible copper beryllium finger strip. However, it is envisioned that a metal brush could be used instead of the finger strip, the important thing being to provide a resilient metal-to-metal contact with the base plate of the cartridge as it is inserted into the tape drive 10.

Figure 2:
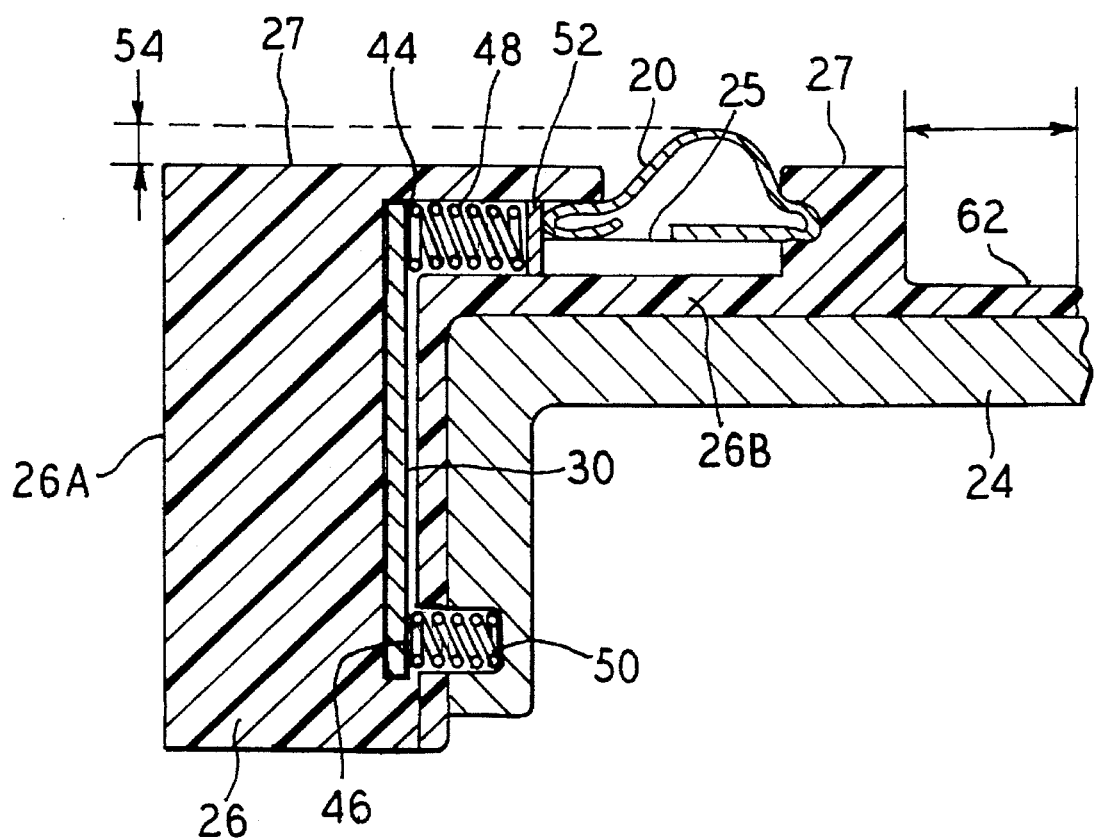
FIG. 2 illustrates in sectional view a portion of the metallic strip assembly of FIG. 1, taken generally along the line II—II of FIG. 1.

As illustrated in FIG. 2, the metallic strip 20 preferably is isolated from the remaining metallic components of the drive chassis or casting 24 by means of an insulating plastic member 26 in which it is received, but is coupled to ground via a thick or thin film, high-voltage resistor 30 connected to chassis ground. The strip 20 is received within a suitably shaped channel 25 in the member 26. The resistor 30 is selected such that a controlled slow discharge from the finger strip 20 to ground is provided. Of course, the use of the term slow in this context is relative, the bleeding taking place over a time period in the millisecond range rather than the nanosecond range. Preferably, the discharge takes place within a time frame greater than one, and preferably, several milliseconds.

During the insertion process, the cartridge 16 itself is isolated from the chassis or casting 24 by means of the plastic member 26 and a continuous inwardly directed extension 62 of the plastic insert 26. The cartridge 16 necessarily is slid over a top surface 27 of the member 26 as the cartridge 16 is inserted into the drive 10.

The first contact between the cartridge 16 and the strip 20 is via a first edge 40 (see FIG. 1) of the cartridge 16. As the cartridge 16 is inserted further, the base plate is wiped by the strip 20.

With continued reference to FIG. 2, it can be seen that the insulating plastic member 26 that insulates the finger strip 20 from ground also comprises part of the front assembly of the tape drive 10. The plastic insulating member 26 is secured onto the main casting 24 of the drive 10 by means of screws or snap-ons not illustrated in this view.

As also illustrated, the insulating member 26 comprises a portion 26B that is secured directly onto the casting 24 and a portion 26A that is securable onto the portion 26B over the resistor 30. Thus, the resistor 30 can be installed after the portion 26B is installed and then the resistor 30 is covered by the portion 26A.

As illustrated best in FIG. 2, the resistor 30 preferably has two solder connections or termination pads 44 and 46 loaded with springs 48 and 50, respectively, which ensure good electrical contact with the metallic strip 20 and the casting 24, respectively. A small pad or block 52 is disposed between the spring 48 and an edge of the strip 20 to provide a flat surface against which the spring 48 can press.

During the insertion process, the tape cartridge 16 basically slides over the exposed wiping surface of the metallic strip 20 and causes the strip 20 to be somewhat compressed by a certain predetermined maximum distance 54, as illustrated. To this end, the tape drive 10 preferably also includes an upper guide for the cartridge 16, e.g., the top edge of the access 12 which ensures that the metallic strip 20 will also be compressed a minimum distance, thereby to ensure that the aluminum base plate of the cartridge 16, including its front edge 40, will always be in contact with the metallic strip 20 so that an electrical discharge path is always provided from the cartridge 16 to the casting 24, i.e., chassis ground. Such a guide would restrict the height of the access 12 thereby forcing the cartridge 16 downward.

To prevent direct arcing from the cartridge base plate to chassis ground, the plastic member 26 also includes a relatively thin extension 62 that extends an adequate distance inwardly into the drive 10 over the casting 24. As discussed above, the metallic base plate must not contact the chassis ground until the electrical charge thereon has been drained off by the resistor 30. Thus, preferably, the extension 62 covers the entire floor of the drive 10 on which the cartridge 16 sits.

The maximum traveling distance of the cartridge 16 into the tape drive 10, divided by the maximum insertion speed of the cartridge 16 results in the maximum discharge time of the base plate to a safe lower voltage limit, for example 50 volts or lower. If an auto-loading mechanism is used, the insertion speed can and must be controlled so that the discharge time is greater than the minimum needed to bleed off the electrostatic charge.

Figure 3:
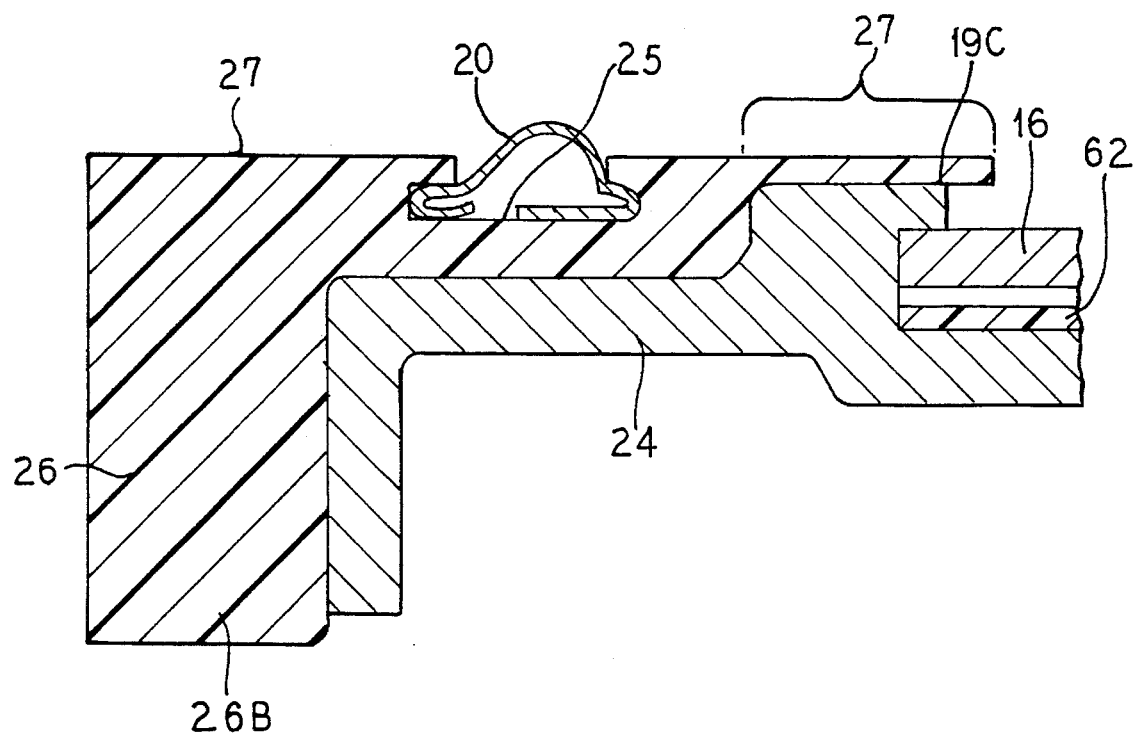
FIG. 3 illustrates in sectional view another portion of the metallic strip assembly of FIG. 1, generally taken along the line III—III of FIG. 1.

As further illustrated in FIG. 3, once the cartridge 16 is fully inserted into the drive 10, the base plate sets on the insulating layer 62 and is captured within lugs 19A, 19B, and 19C (only lug 19A is illustrated). The capturing of the base plate in this manner provides for continuous metal-to-metal contact between the base plate and the casting 24.

This metal-to-metal contact is needed for two reasons: (1) together the blocks 19A, 19B, and 19C define a previously machined three-point reference plane so that the cartridge is held fast in a known position, and (2) during operation of the tape cartridge triboelectrically generated charges in the contact area between the cartridge drive wheel and the capstan wheel can be drained off to chassis ground. Normally, the capstan motor shaft to which the capstan rubber wheel is fitted is grounded.

Finally, the insulating exterior of the surface 27 of the member 26 over at least the lug 19A can be seen in FIG. 3.

Figure 4:
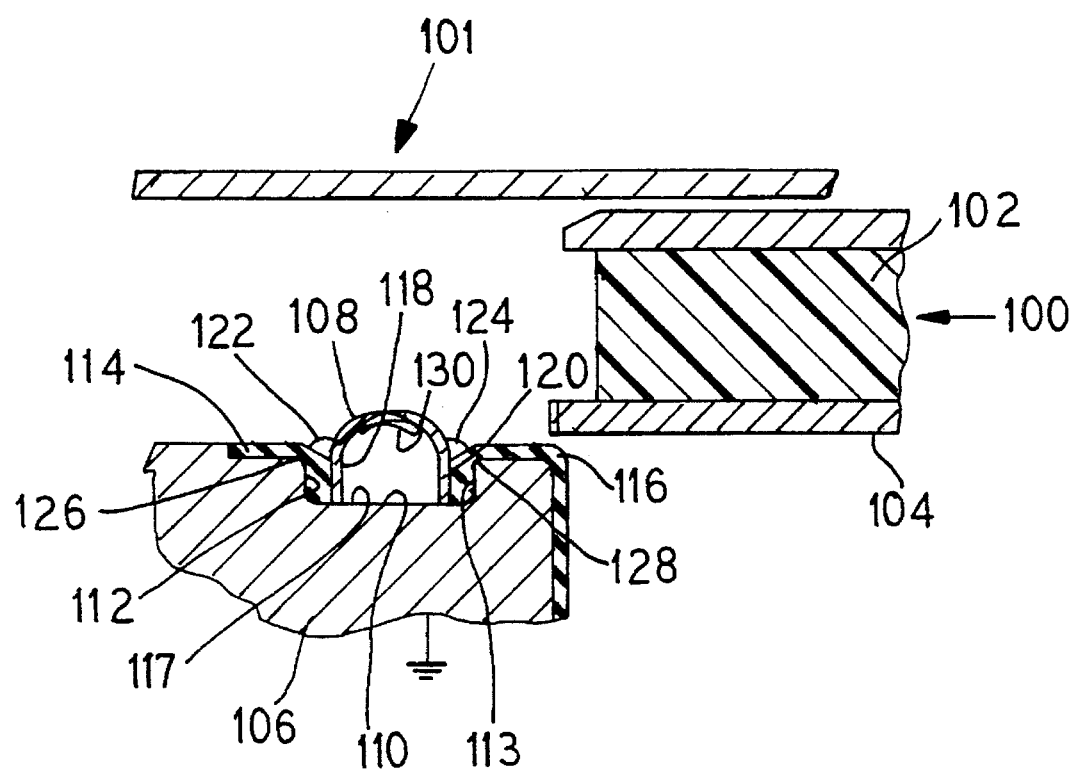
FIG. 4 illustrates a compressible grounding strip made of a conductive polymer in place of the metallic grounding strip of FIGS. 1–3.

In addition to the foregoing, it has been discovered that the metallic finger strip arrangement of FIGS. 1–3 can be replaced with a compressible strip made of conductive plastic or semiconductive material. This strip can also be made in the form of a series of compressible fingers. In FIG. 4, there is illustrated an embodiment of such a construction.

In FIG. 4 there is illustrated a tape cartridge 100 in the process of being inserted into a tape drive 101 employing a conductive polymer member as the grounding strip or wiping member. The conductive polymer material used can be a conductive plastic, for example, a plastic material in which are embedded metallic particles such as that described in U.S. Pat. No. 4,392,177, the disclosure of which is filly incorporated herein by reference. Such materials on bending or flexing permit the metallic particles to touch, thereby to provide an electrical path therethrough. It is also possible to use a suitably anti-static treated polymer such as that or those described in U.S. Pat. No. 3,071,791, the disclosure of which is fully incorporated hereby by reference, or a coated polyester film such as is discussed in U.S. Pat. No. 3,601,654, fully incorporated herein by reference.

As illustrated, the cartridge 100 includes a plastic cover 102 and the above mentioned aluminum baseplate 104.

The tape drive includes a chassis 106 coupled to ground, and a compressible finger strip 108 made of the conductive polymer which serves as the wiping member or grounding strip. The strip 108 preferably is arcuate, as illustrated, in shape and is inserted so as to face a suitable channel 110 formed in the chassis 106. The side walls 112 and 113 of the channel 110 are covered by suitable electrically insulating material 114 and 116, respectively. The bottom or floor 117 of the channel 110 is left uncovered so that legs 118 and 120 of the strip 108 can make electrical contact therewith so that electrical charge collected on the strip 108 can be bled to ground therethrough. Of course, other constructions are possible so long as there is a suitable electrical interconnection between the strip 108 or its electrical equivalent and ground.

As can be appreciated, the arcuate bending of the finger strip 108 will cause the legs 118 and 120 thereof to be spring-loaded, i.e., biased to open outwardly, so that the finger strip 108 actually can be retained in the channel 110 at least partly due to the spring loading. Of course, suitable adhesives could be used as well.

In addition, as is illustrated in FIG. 4, two beads or welds 122 and 124 of a suitable dielectric material are provided to prevent an arcing of electrical charges between the finger strip 108 and the chassis 106. The beads or welds 122 and 124 are disposed in the corners formed on opposite sides of the finger strip 108 between the finger strip 108 and the top edges 126 and 128 of sidewalls 112 and 113 of the channel 110.

A backing strip 130 is secured to the underside of the apex of the arc of strip 108 to reinforce the strip 108 at the point where it will compress and to enhance its resiliency.

By using a conductive polymer or plastic strip in place of a metallic strip, it is possible to eliminate the use of a bleeder resistor as is used in the embodiment of FIGS. 1–3, as the material of the conductive plastic or polymer will inherently more slowly discharge electrical charges. In other words, electrical discharge is inherently delayed by the nature of the conductive polymer. As such, the conductive polymer or plastic discharge strip 108 can be characterized as an electrical discharge bleeder with a built-in resistor.

It can be appreciated that the resistance of such a strip made of a conductive polymer is a function of the dimensions of the strip and the sensitivity of the strip material which may be manipulated to obtain various discharge time. Preferably, such a strip is constructed to have a discharge time of 1 millisecond or more.

While preferred embodiments have been shown, modifications and changes may become apparent to those skilled in the art which shall fall within the spirit and scope of the invention. It is intended that such modifications and changes be covered by the attached claims.

What is claimed is:

1. A magnetic tape drive for magnetic tape housed within a cartridge, comprising a rectangular access through which the cartridge is inserted along a tape cartridge path into the drive and a wiping member operatively positioned and extending along an edge of the access to contact the cartridge during and throughout insertion of the cartridge into the drive, the wiping member being coupled to electrical ground to bleed electrostatic charge on the cartridge to electrical ground, the wiping member comprising a conductive polymer material, the wiping member comprising a resilient structure that engages the cartridge along an entire width of a face of the cartridge, the wiping member comprising a compressible strip, the wiping member having a resistivity and dimensions such that an electrical charge is bled from the cartridge to electrical ground over a time frame greater than one millisecond, the wiping member having a convex surface which is bent into the tape cartridge path and is compressed towards a base of the access by the tape cartridge as the cartridge is inserted into the drive.

2. The magnetic tape drive of claim 1, wherein the wiping member comprises a finger strip.

3. The magnetic tape drive of claim 1, wherein the wiping member comprises a polymer in which are embedded conductive metal particles.

4. The magnetic tape drive of claim 1, wherein the wiping member comprises a polymer coated with an electrically conductive coating.

5. The magnetic tape drive of claim 1, further comprising a channel formed along the edge within which the wiping member is located.

6. The magnetic tape drive of claim 1, further comprising a channel extending along the edge of the access, the wiping member being operatively received and secured within the channel, a top of the wiping member forming said convex surface which makes contact with the tape cartridge as it is inserted into the tape drive.

7. The magnetic tape drive of claim 6, comprising insulating matter operatively disposed between the wiping member and the side walls of the channel.

8. A magnetic tape drive for magnetic tape housed within a cartridge which has a metal base plate, the tape drive comprising:

a chassis;

a drive housing mounted on the chassis, the drive housing having an access through which the cartridge is received along a tape cartridge path into the drive, the access being substantially rectangular in shape, the access including a wiping member operatively positioned along an edge thereof to wipe the cartridge while it is inserted into the drive and operatively coupled to electrical ground thereby to remove electrostatic charge from the cartridge within a time frame greater than one millisecond, the wiping member comprising a conductive polymer material, the wiping member comprising a resilient structure that engages the cartridge along an entire width of a face of the cartridge, the wiping member comprising a compressible strip and having a convex surface which is bent into the tape cartridge path and is compressed towards a base of the access by the cartridge base plate as the cartridge is inserted into the tape drive.

9. The magnetic tape drive of claim 8, wherein the wiping member comprises a finger strip.

10. The magnetic tape drive of claim 8, wherein the wiping member comprising a conductive polymer in which are embedded conductive metal particles.

11. The magnetic tape drive of claim 8, wherein the wiping member comprises a conductive polymer coated with an electrically conductive material.

12. The magnetic tape drive of claim 8, further comprises a channel extending along the edge of the access, the wiping member being operatively received and secured within the channel, a top of the wiping member forming said convex surface which makes contact with the tape cartridge as it is inserted into the tape drive.

13. The magnetic tape drive of claim 8, further comprising a channel formed along the edge of the access within which the wiping member is located.

14. The magnetic tape drive of claim 13, comprising insulating matter operatively disposed between the wiping member and side walls of the channel.

15. A magnetic tape drive for magnetic tape housed within a cartridge having a metal base plate, the tape drive including means for coupling the metal base plate to electrical ground as the cartridge is inserted along a tape cartridge path into the tape drive in such a manner that electrostatic charge on the cartridge is discharged to electrical ground over a time frame greater than one millisecond, the means comprising a wiping member having a resilient structure made with a conductive polymer material, the wiping member extending along an edge of a rectangular access in the tape drive for the cartridge and engaging the cartridge along an entire width of a face of the cartridge throughout the insertion process, the wiping member comprising a compressible strip and having a convex surface which is bent into the tape cartridge path and is compressed towards a base of the access by the cartridge base plate as the cartridge is inserted into the tape drive.

16. The magnetic tape drive of claim 15, wherein the wiping member comprises a finger strip.

17. The magnetic tape drive of claim 15, wherein the wiping member comprising a polymer in which are embedded conductive particles.

18. The magnetic tape drive of claim 15, wherein the wiping member comprising a polymer coated with an electrically conductive coating.

19. The magnetic tape drive of claim 15, further comprising a channel extending along the edge of the access, the wiping member being operatively received and secured within the channel, a top of the wiping member forming said convex surface which makes contact with the tape cartridge as it is inserted into the tape drive.

20. The magnetic tape drive of claim 15, further comprising a channel formed along the edge of the access within which the wiping member is located.

21. The magnetic tape drive of claim 20, comprising insulating matter operatively disposed between the wiping member and the side walls of the channel.

* * * * *